No. 621,705. Patented Mar. 21, 1899.
N. W. RASNICK.
HAIR FASTENER.
(Application filed May 19, 1898.)
(No Model.)

Witnesses
T. P. Britt
Chas. D. Brock

Inventor
Noah W. Rasnick,
by O'Meara
Attorneys

THE NORRIS PETERS CO., PHOTO-LITHO., WASHINGTON, D. C.

ABE IT KNOWN THAT I

UNITED STATES PATENT OFFICE.

NOAH WEBSTER RASNICK, OF PALACE, VIRGINIA, ASSIGNOR OF ONE-FIFTH TO JOHN F. McCOY, OF TUSCOLA, VIRGINIA.

HAIR-FASTENER.

SPECIFICATION forming part of Letters Patent No. 621,705, dated March 21, 1899.

Application filed May 19, 1898. Serial No. 681,144. (No model.)

*To all whom it may concern:*

Be it known that I, NOAH WEBSTER RASNICK, a citizen of the United States, residing at Palace, in the county of Dickenson and State of Virginia, have invented a new and useful Hair-Pin, of which the following is a specification.

My invention relates to hair-pins, and has for its object to provide a hair-pin which will automatically resist any attempt to draw it from the hair after being placed therein, but at the same time capable of being easily adjusted into position to permit of its being readily withdrawn or inserted.

With this object in view my invention consists in a hair-pin provided with two or more tines pivotally secured to a body or frame and connected at their upper ends by links, a spring operating upon the links to separate the upper ends of the tines of the hair-pin and throw their points together, and a push-pin projecting from the body and attached at its inner end to the connecting-links, whereby their inner ends may be drawn together by inward pressure thereon.

My invention further consists in the improved construction, arrangement, and combination of parts hereinafter fully described and afterward specifically pointed out in the appended claims.

In order to enable others skilled in the art to which my invention most nearly appertains to make and use the same, I will now proceed to describe its construction and operation, reference being had to the accompanying drawings, forming part of this specification, in which—

Figure 1:
Figure 4:
Figure 2:
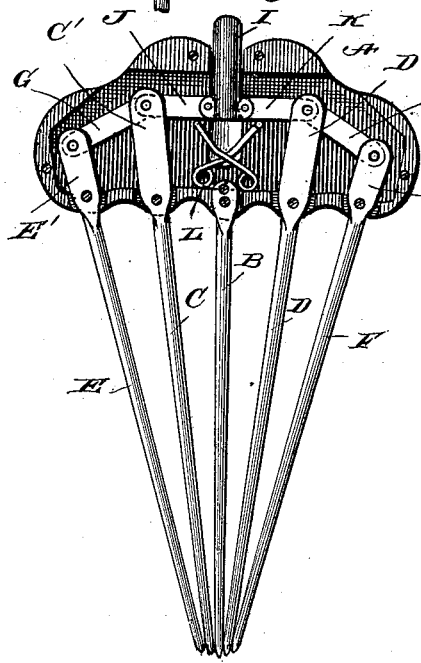
Figure 3:
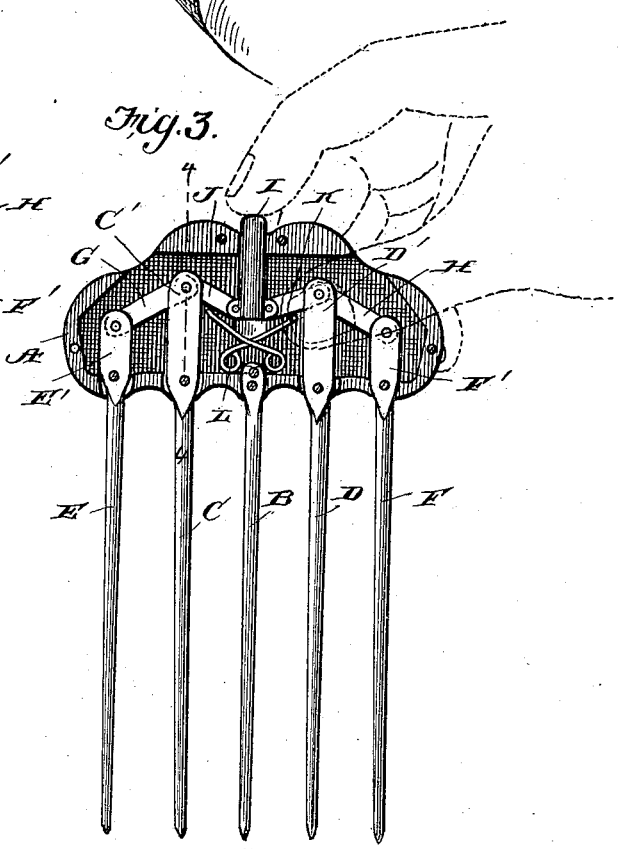

Figure 1 is a view illustrating the practical operation of my invention. Fig. 2 is a view illustrating a hair-pin constructed in accordance with my invention, in elevation, the upper face of the inclosing body being removed and the tines being in their normal positions pressed inward toward each other at the points. Fig. 3 is a similar view with the push-pin pressed inward and the tines parallel with each other in position to be inserted into or removed from the hair. Fig. 4 is a detail sectional view on the line 4 4 of Fig. 3.

Like letters of reference mark the same parts wherever they occur in the different figures of the drawings.

Referring to the drawings by letters, A indicates the body in which the operative parts of my invention are inclosed, said body being composed of front and rear plates connected together by small screws or rivets, one of said plates being removed in Figs. 2 and 3.

B indicates a central fixed tine.

C, D, E, and F indicate tines which are pivotally connected to the lower edge of the body and have flat upper ends extending into the interior thereof, said flat ends C' and D' of the tines C and D being longer than the flat ends E' and F' of the tines E and F. The ends E' and C' are pivotally connected together by a link G and the ends D' and F' by a link H.

I indicates a push-pin slidably mounted in an opening in the upper edge of the body A and extending into the interior thereof, its inner end being pivotally connected by a link J with the inner end C' of the tine C and by a link K with the inner end D' of the tine D. Springs L have an outward bearing against the links J and K, with a normal tendency to throw the push-pin I to its outermost position. This brings the links J and K into line with each other and causes the inner ends C' and D' of the tines to be moved farthest away from the push-pin, and in this position the connecting-links G and H press the inner ends E' and F' of the tines E and F to their extreme outer positions, so that when the push-pin is in its normal outer position the inner ends of the tines are farthest separated and their points are brought together, as shown in Fig. 2. In this position it would be almost impossible to press the pin into the hair; but by pressing the push-pin inward, as illustrated in Fig. 3, the inner ends of all of the tines, except the rigid tine B, are drawn inward toward each other until the tines themselves are brought into parallelism, as shown in Fig. 3, in which position they can be readily entered into or withdrawn from the hair. When held in this position and entered into the hair, the release of the push-pin by removing the finger from the outer end thereof will permit the springs L to come into operation, forcing the links J and K outward and bringing the parts into the position shown in Fig. 2. In this position, as before stated, the links J and K will be in line with each other, which will render it impossible to separate the points of the tines C and D, and consequently of the tines E and F, without pressing the push-pin inward, so as to break this line of resistance.

From the foregoing description, taken in connection with the drawings, it will be readily understood that the rigid tine B may be omitted or that the outer tines E and F might be omitted, whether the rigid tine were used or not, without departing from the spirit of my invention, and while I have illustrated and described what I now consider to be the best means for carrying out my invention I desire it to be understood that I do not wish to restrict myself to the exact details of construction shown, but hold that many slight changes might be made therein without departing from the spirit and scope of my invention.

Having thus fully described my invention, what I claim as new, and desire to secure by Letters Patent of the United States, is—

1. The combination in a hair-pin, of a plurality of pivoted tines having ends projecting beyond their pivots, springs for normally holding the inner ends apart and the points of the tines together, and means for drawing the inner ends toward each other and separating the points of the tines against the action of the springs, substantially as described.

2. The combination in a hair-pin, of a main body, a plurality of tines pivoted thereto and having ends projecting into the body beyond the pivots, a push-pin adapted to slide in an opening in the body, links connecting the inner ends of the tines with the push-pin, and springs bearing upon the links with a normal tendency to hold the push-pin in its outer position in which the tines are together at their outer points, substantially as described.

NOAH WEBSTER RASNICK.

Witnesses:
  JOHN F. McCOY,
  J. C. COUNTS.